Nov. 23, 1948.　　　A. B. BROLUSKA　　　2,454,428
FLUID PRESSURE TURBINE
Filed Aug. 28, 1947　　　　　　　　　　　　4 Sheets-Sheet 1
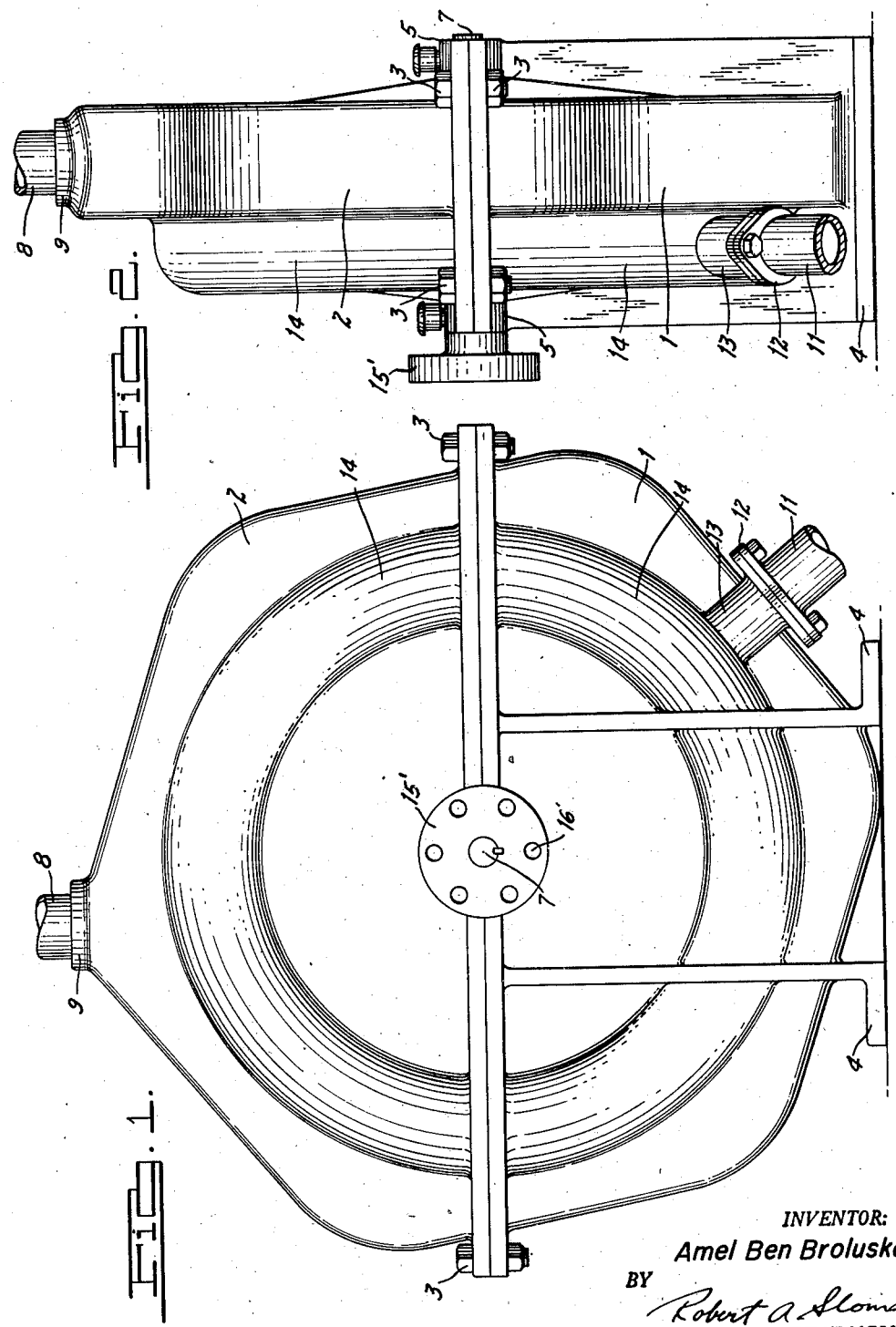
INVENTOR:
Amel Ben Broluska,
BY
Robert A. Sloman
ATTORNEY.

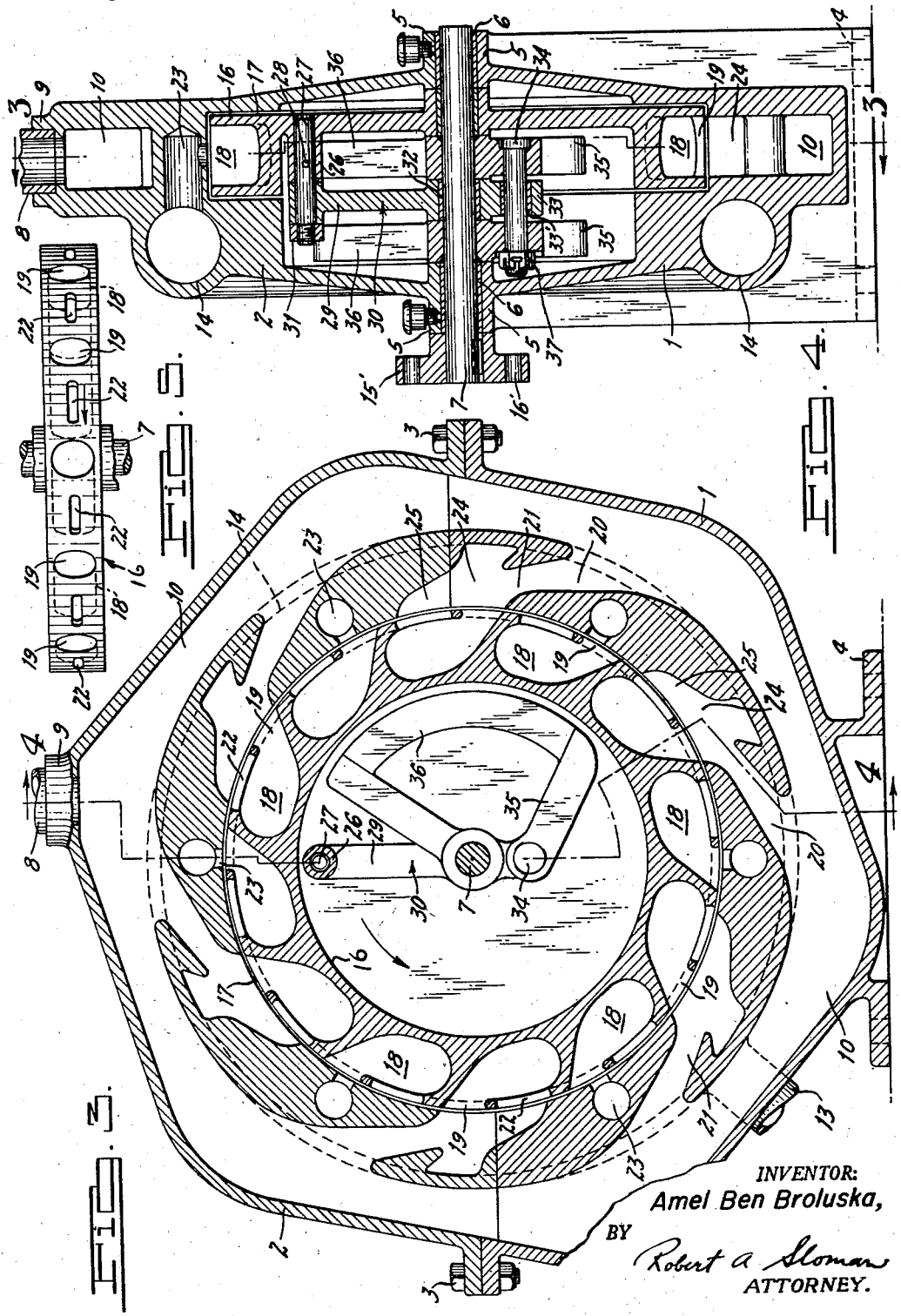

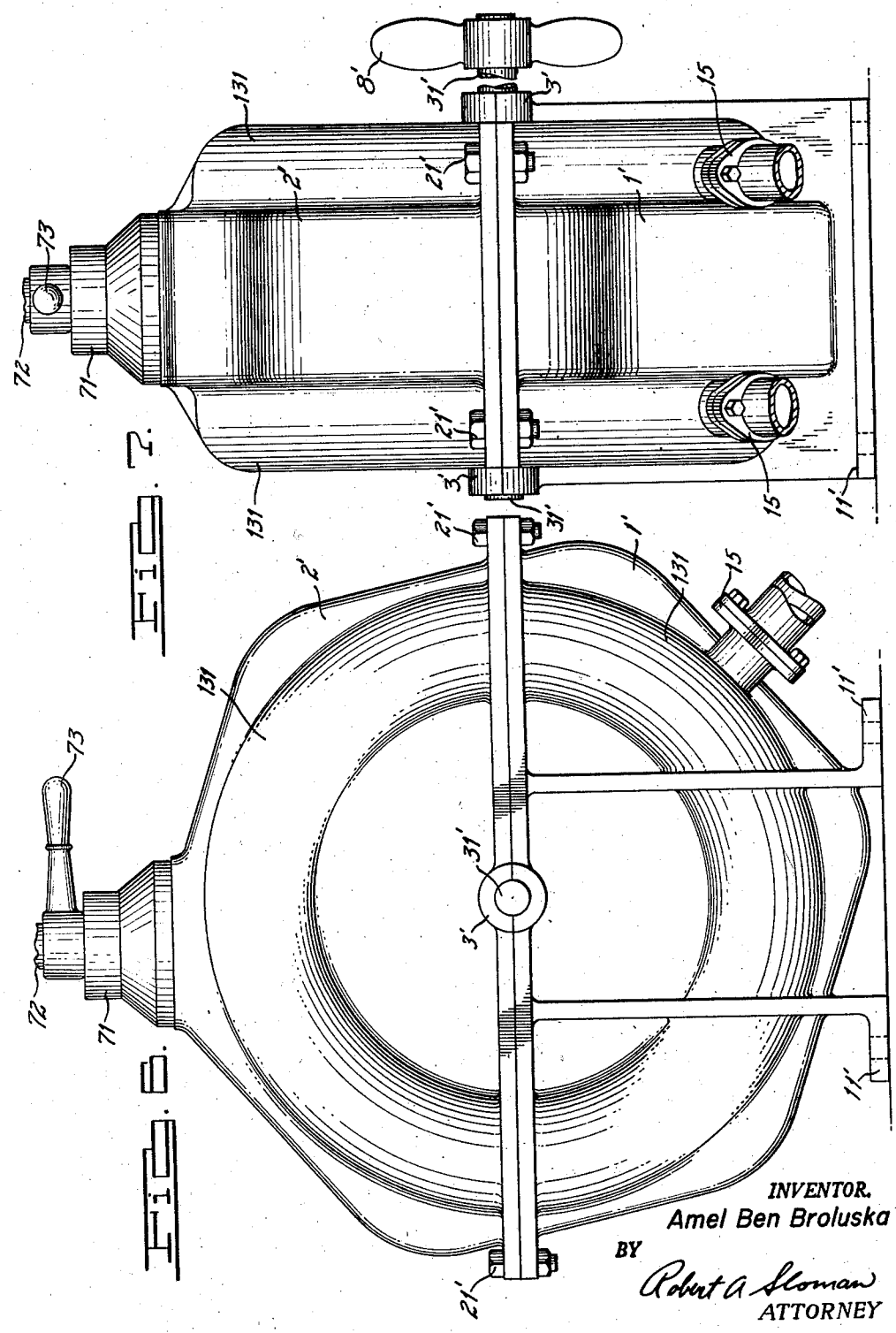

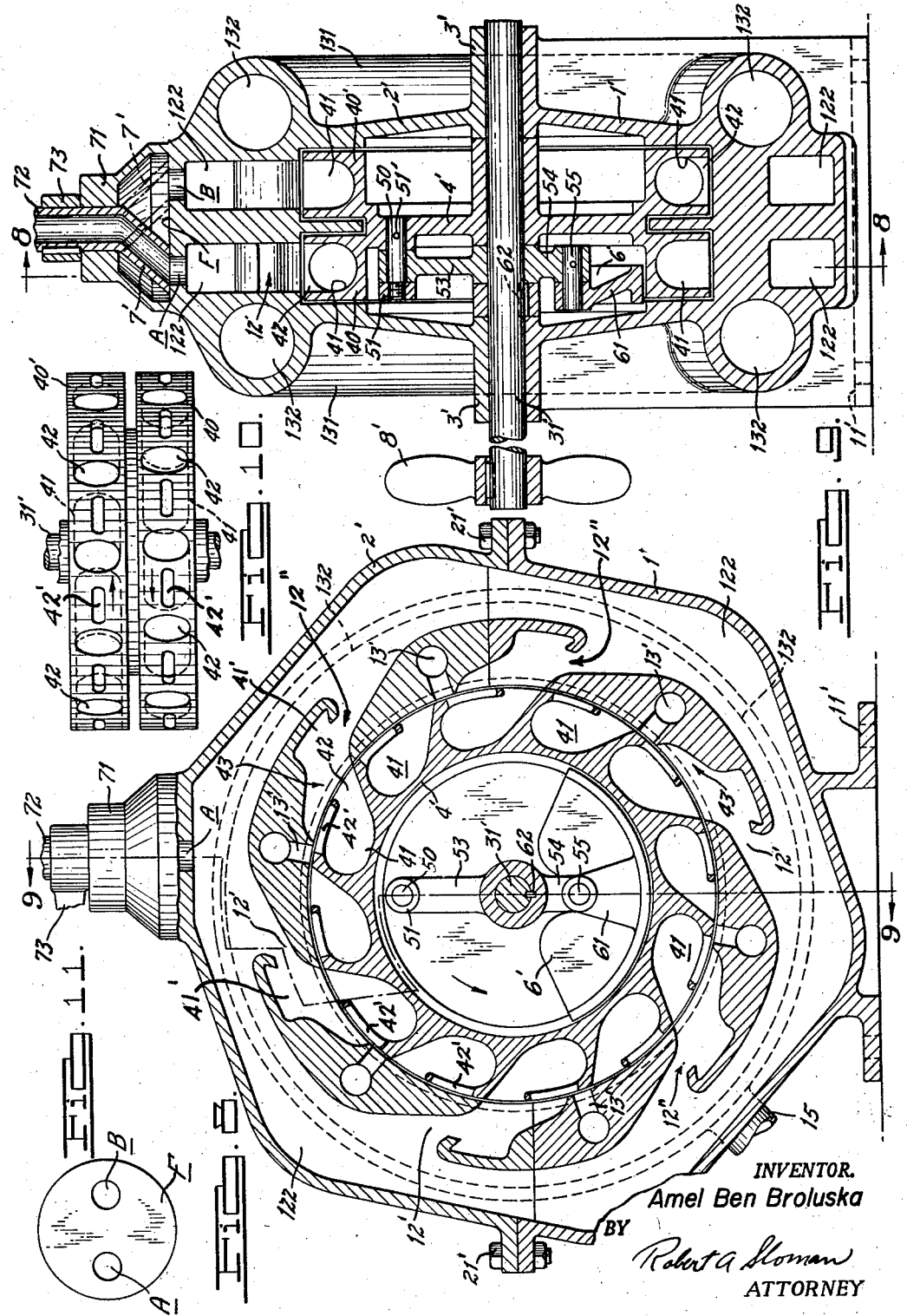

Patented Nov. 23, 1948

2,454,428

UNITED STATES PATENT OFFICE 2,454,428

FLUID PRESSURE TURBINE

Amel Ben Broluska, Detroit, Mich.

Application August 28, 1947, Serial No. 771,079

11 Claims. (Cl. 253—50)

This application is a continuation in part of my prior co-pending application Serial No. 578,975 filed February 21, 1945, now abandoned relating to fluid pressure turbines.

The invention herein relates to turbines operated by fluid pressure such as steam or compressed air, and the principal object is to transmit the fluid pressure into rotary motion by a simplified construction which is economical in power consumption.

It is the object of this invention to provide a turbine adapted for high speed for driving dynamos and the like, but which is also adapted for operating at relatively low speeds, such as in the propulsion of ships without the use of gear driving mechanism.

It is the further object of this invention to provide a turbine of such construction that its direction of rotation may be easily and quickly reversed.

It is the still further object of this invention to provide in such turbine construction a mechanical means for multiplying the power output thereof.

These and other objects will be seen from the following specification and claims in conjunction with the appended drawings in which:

Figure 1 is a front elevational view of the turbine.

Figure 2 is a side elevational view thereof.

Figure 3 is an elevational section on line 3—3, Fig. 4.

Figure 4 is an elevational section on line 4—4, Fig. 3.

Figure 5 is a plan view of the single rotor.

Figure 6 is a front elevational view of a different form of turbine.

Figure 7 is a side elevational view thereof.

Figure 8 is an elevational section on line 8—8, Fig. 9.

Figure 9 is an elevational section on line 9—9, Fig. 8.

Figure 10 is a plan view of the double rotor therefor; and

Figure 11 is a fragmentary plan view of the seat portion of the reversing valve mechanism showing the spaced inlet ports.

It will be understood that the above drawings illustrate merely several preferable embodiments of the invention, and that other embodiments are contemplated within the scope of the claims hereafter set out.

Referring to the drawings, Figures 1 through 5, the turbine housing consists of hollow upright body members 1 and 2 whose central opposed outwardly projecting flanges are sealingly joined and secured to each other by a plurality of bolts 3.

The supporting feet 4 are integral with base 1 and project downwardly to form a mounting support for the turbine, while body member 2 provides a suitable cover therefor.

Hollow central bearing supports 5 are arranged at opposite sides of the turbine housing 1, 2 and have supported therein cylindrical bearings 6 through and upon which shaft 7 is rotatably supported.

Inlet pipe 8 is properly joined to inlet port 9 formed within the turbine housing, said port communicating with the hollow substantially annularly shaped pressure fluid inlet manifold 10 on the interior thereof.

Exhaust pipe 11 is coupled at 12 with the hollow exhaust flange 13 which projects outward radially from turbine base 1. The inner end of exhaust flange 13 communicates with the annular exhaust chamber 14 formed within turbine body 1, 2.

Rotatable shaft 7 has keyed thereon outside said housing the flanged coupling element 15' with securing openings 16' therein Figures 1 and 4. Coupling 15' is adapted for attachment to any desired power outlet or shaft to be driven by the turbine.

Circular rotor 16 shown in Figure 5 is loosely journalled upon shaft 7 for rotation within annular opening 17 in turbine housing 1, 2. A series of cavities or pockets 18 with inlet ports 19 are formed within and around the peripheral portions of rotor 16 for receiving the driving pressure fluid such as steam for example. The driving fluid in chamber 10 is supplied through passages 20 formed in the turbine housing which have delivery throat portions or jets 21 of reduced diameter for directing pressure fluid at high velocity into ports 19 of rotor cavities 18 for effecting rotative motion of rotor 16.

Pressure fluid is directed at high velocity into cavities 18 from jets 21 for impingement upon the leading interior walls thereof, whence the fluid is promptly exhausted through the slotted exhaust ports 22. The latter are adapted for intermittent registry with the series of radially arranged exhaust channels 23 in the turbine housing which in turn connect with the exhaust manifold 14.

The high velocity attained by the pressure fluid in turn causes a moderate high velocity of rotor 16 as it is radially directed into the several cavities 18 arranged about rotor 16. Means are provided by the exhaust ports 22 and exhaust channels 23 to permit the prompt escape of pressure fluid into exhaust manifold 14 whence it is dispelled through the exhaust pipe 13.

Cavities 18 are preferably of circular cross section in applicant's preferable embodiment, however, it is contemplated that the same may be rectangular or other shape if desired.

As viewed in Figure 3 the jets 21 communicate with the enlarged expansion chambers 24 from which pressure fluid may be supplied to the cavity ports 19. It will be noted that said expansion chambers have a leading portion 25 extending in the direction of rotation as indicated by the arrow in Figure 3, to avoid a dead center condition, so that pressure fluid will always be available to the inlet ports 19 of rotor cavities 18.

Rotor 16 has an inwardly projecting hollow-boss 26 from which projects crank pin 27 secured therein by pin 28. Pin 27 extends through a transverse opening in the long arm 29 of bell crank 30 and is secured thereto by nut 31.

Bell crank 30 is rotatably journalled loosely upon shaft 7 upon bushing 32 thereon, and moves at all times in unison with rotor 16. The short end 33 of said bell crank has a transverse opening with bushing 33' positioned therein.

Driving pin 34 projects through bushing 33' and is secured to the short ends 35 of the compound levers or operating members 36 positioned upon opposite sides of bell crank 30, by means of threaded nut 37.

The operating means 36 shaped in the form of a quadrant are respectively secured in driving relation to rotatable shaft 7 as by welding, for transmitting rotative motion thereto.

Thus the power generated by rotor 16 is transmitted to shaft 7, being multiplied by the cantilever 30 which drives the spaced operating means or quadrants 36, carried on shaft 7.

Referring to Figures 3 and 4 it will be seen that a rotative thrust is delivered to cantilever 30 at its long end with shaft 7 acting as a fulcrum. Consequently, the short end 33 of the lever 30 will deliver a proportionately greater thrust. This follows in view of the basic principle of lever arms and fulcrums, wherein a thrust at the long end of the lever is multiplied at its short end.

Thus, this increased thrust at the end of the short arm 33 is transmitted through pin 34 to the long ends of the compound levers or quadrants 36, whose opposite ends are secured in driving relation to rotatable shaft 7, as by welding.

Consequently the driving effect of rotor 16 upon shaft 7 and its coupling 15' is increased by employing the lever 30 intermediate to shaft operating means 36 and rotor 16.

A different form of the invention is illustrated in Figures 6 through 11 wherein the double reversible rotor of Figure 10 is employed.

The turbine housing consists of the hollow upright body members 1' and 2' whose central opposed outwardly projecting flanges are sealingly joined and secured to each other by a plurality of bolts 21'.

The supporting legs or feet 11' are integral with said base and project downwardly to form a mounting support for the housing, while body member 2' forms a suitable cover for the turbine.

Hollow central bearing portions 3' are arranged at opposite sides of turbine housing 1' 2' and project outwardly therefrom to rotatably journal shaft 31'. For illustration, a marine propeller 8' is keyed to the outer end of drive shaft 31'' as shown in Figure 9. The turbine casing has an upright extension 71 forming a part thereof within which is rotatably mounted the hollow pressure fluid inlet valve element 72 which is suitably joined to the motive power employed such as steam.

A pair of substantially annular pressure fluid inlet manifolds 122 are arranged in spaced relation within the turbine housing having inlet ports A and B Figures 8, 9 and 11.

Hollow valve element 72 with actuating handle 73, has an angularly inclined hollow portion 7' which in the position of valve 72 Figure 9 is in registry with manifold inlet port A. When turned 180 degrees valve element 7' will be in registry with manifold inlet port B as indicated in dotted lines in Figure 9.

The seat F Figures 9 and 11 forms a part of the turbine housing, while its openings A and B are adapted for independent registry with hollow valve element 7' whereby pressure fluid can be alternately supplied to either of the fluid pressure manifolds 122 as desired.

The double rotor with spaced circular rotor elements 40 and 40' has a central webbing 4' whose hollow central hub is rotatably journalled loosely upon drive shaft 31'.

Drive pin 50 projects laterally from a hollow boss in rotor web 4' being secured therein by locking pin 51'. The outer end of pin 50 extends through an opening in the long arm 53 of cantilever 53, 54 and is secured thereto by the nut 51.

Lever 53, 54 is rotatably journalled loosely upon shaft 31', and a second driving pin 55 projects laterally from the outer end of the short arm 54. Drive pin 55 extends through a corresponding opening in the driving arm 61 forming a part of shaft driving quadrant 6'. The formed central portion of quadrant 6'' is keyed at 62 upon shaft 31' in driving relation for transmitting the driving forces delivered from rotors 40, 40'.

In the manner above described with respect to Figures 3 and 4 it is seen that an increased driving force is delivered to shaft 31' by levers 53, 54, lever element 61 and the driving means 6'. A much greater thrust is delivered to shaft 31' than could be accomplished by directly connecting rotor 40, 40' thereto. The rotor elements 40, 40' have a series of cavities 41 therein which are oppositely arranged within said rotor elements, whereby the direction of rotation may be reversed, when valve 7' is turned to establish fluid pressure communication to either of the manifold ports A or B.

Cavities 41 with inlet ports 42 are formed within and around the peripheral portions of rotors 40' and 40'' for receiving the driving fluid such as steam from the respective manifolds 122.

Pressure fluid in either of manifolds 122 is supplied to the radial passages 12' formed within the turbine housing, which terminate in the jets 12''. Pressure fluid is delivered through jets 12''' and into cavities 41 at relatively high velocity causing rotation of the rotor 40, 40'.

The turbine housing has formed therein the radially positioned expansion chambers 41' adjacent jets 12'', relative to which cavities 41 are movable. Chambers 41' have forwardly extending portions 43 extending in the direction of rotation for supplying pressure fluid to the cavity inlet ports 42 where necessary to avoid a dead center condition.

Impinging fluid within cavities 41 can now expand and be immediately exhausted through the slotted exhaust openings 42' which intermittently register with exhaust passages 13' communicating with the two exhaust manifolds 132 upon opposite sides of rotors 40, 40'.

If pressure fluid such as steam is supplied through inlet A Figure 9, the exhaust will be into the left hand manifold 132 formed within the turbine housing. The latter has the corresponding annular enlargements 131 upon opposite sides thereof which correspond to exhaust manifolds 132.

Suitable exhaust fittings communicate with manifolds 132 for conducting away the exhaust pressure fluid from the turbine.

Rotor 40, 40' may be driven in reverse direction merely by turning valve 72 so that pressure fluid is selectively supplied to ports A or B of the inlet manifolds 122. With pressure fluid supplied to port A as in Figures 8 and 9, rotor 40, 40' will rotate counterclockwise as indicated by the arrow in Figure 8, with only the cavities of rotor 40 actuated.

With valve 72 turned 180 degrees, pressure fluid will be supplied to port B and into manifold 122 for direction to the oppositely arranged cavities 41 within rotor 40' to effect rotation in a clockwise direction.

It will be observed from the foregoing description and by reference to the drawings that I have provided a turbine which is simple in construction and economical to manufacture and which is furthermore adapted to various purposes such as the driving of electric generators and other types of machinery, as well as for the propulsion of vehicles such as airplanes, automobiles, locomotives and marine vessels of all kinds. While I have herein described and shown several preferred embodiments of said invention, it will be readily understood by those skilled in the art to which the same pertains, that various modifications in detail may be made to suit any particular requirement without departing from the spirit of my invention as defined in the appended claims.

Having described my invention, reference should now be had to the claims which follow for determining the scope thereof.

I claim:

1. In a pressure fluid jet turbine having a casing and a driven shaft therein, a rotor loosely journaled on said shaft and having a series of cavities disposed around its periphery with inlet and exhaust openings abutting upon the inner surface of said casing, there being a plurality of pressure fluid jets in said casing adapted for registry with said inlet openings, and a plurality of outlet ports in said casing adapted for registry with said exhaust openings, operating means keyed to said shaft, and a lever loosely journaled on said shaft having its long end joined to said rotor and its short end joined to said operating means.

2. In a pressure fluid jet turbine having a casing and a driven shaft therein, a rotor loosely journaled on said shaft and having a series of cavities disposed around its periphery with inlet and exhaust openings abutting upon the inner surface of said casing, there being a plurality of pressure fluid jets in said casing adapted for registry with said inlet openings, and a plurality of outlet ports in said casing adapted for registry with said exhaust openings, operating means keyed to said shaft, and a lever loosely journaled on said shaft intermediate said rotor and said operating means, and having its long end joined to said rotor and its short end joined to said operating means.

3. In a pressure fluid jet turbine having a casing and a driven shaft therein, a rotor loosely journaled on said shaft and having a series of cavities disposed around its periphery with circular inlet openings and spaced slotted exhaust openings abutting upon the inner surface of said casing, there being a plurality of pressure fluid jets in said casing adapted for registry with said inlet openings, and a plurality of outlet ports in said casing adapted for registry with said exhaust openings, operating means keyed to said shaft, and a lever loosely journaled on said shaft having its long end joined to said rotor and its short end joined to said operating means.

4. In a pressure fluid jet turbine having a casing and a driven shaft therein, a rotor loosely journaled on said shaft and having a series of cavities disposed around its periphery with inlet and exhaust openings abutting upon the inner surface of said casing, there being a pair of oppositely arranged pressure fluid inlet jets in said casing adapted for successive registry with said inlet openings, and a pair of oppositely arranged outlet ports in said casing adjacent said jets adapted for registry with said exhaust openings, operating means keyed to said shaft, and a lever loosely journaled on said shaft having its long end joined to said rotor and its short end joined to said operating means.

5. In a pressure fluid jet turbine having a casing and a driven shaft therein, a rotor loosely journaled on said shaft and having a series of cavities disposed around its periphery with inlet and exhaust openings abutting upon the inner surface of said casing, there being a plurality of pressure fluid jets in said casing adapted for registry with said inlet openings, and a plurality of outlet ports in said casing adapted for registry with said exhaust openings, operating means keyed to said shaft, and a lever loosely journaled on said shaft having its long end joined to said rotor and its short end joined to said operating means, there being a plurality of expansion chambers formed in said casing adjacent said jets and forwardly thereof in the direction of rotation and relatively to which said cavities are movable.

6. In a reversible turbine having a casing and a driven shaft therein, a pair of integral rotors loosely journaled on said shaft each having a series of oppositely arranged cavities disposed around its periphery with inlet and exhaust openings abutting the inner surface of said casing, there being a plurality of pressure fluid jets in said casing adapted for successive registry with said inlet openings in either of said rotors, and a plurality of outlet ports in said casing adapted for registry with said exhaust openings, operating means keyed to said shaft, and a lever loosely journaled on said shaft having its long end joined to said rotors and its short end joined to said operating means.

7. In a removable turbine having a casing and a driven shaft therein, a pair of integral rotors loosely journaled on said shaft each having a series of oppositely arranged cavities disposed around its periphery with inlet and exhaust openings abutting the inner surface of said casing, there being a plurality of pressure fluid jets in said casing adapted for successive registry with said inlet openings in either of said rotors, and a plurality of outlet ports in said casing adapted for registry with said exhaust openings, operating means keyed to said shaft, a lever loosely journaled on said shaft having its long end joined to said rotors and its short end joined to said operating means, there being a pressure fluid source in said casing, and a manual valve in said casing adapted to selectively supply pressure fluid to either rotor controlling jets.

8. In a reversible turbine having a casing and a driven shaft therein, a pair of integral rotors loosely journaled on said shaft each having a series of oppositely arranged cavities disposed around its periphery with inlet and exhaust openings abutting the inner surface of said casing, there being a plurality of pressure fluid jets in said casing adapted for successive registry with said inlet openings in either of said rotors, and a plurality of outlet ports in said casing adapted for registry with said exhaust openings, operating means keyed to said shaft, and a lever loosely journaled on said shaft having its long end joined to said rotors and its short end joined to said operating means, said casing having therein a pair of intake manifolds each common to the jets corresponding to each rotor, and a pair of exhaust manifolds each common to the outlet ports corresponding to each rotor.

9. In a pressure fluid jet turbine having a casing and a driven shaft therein, a rotor loosely journaled on said shaft and having a series of cavities disposed around its periphery with inlet and exhaust openings abutting upon the inner surface of said casing, there being a plurality of pressure fluid jets in said casing adapted for registry with said inlet openings, and a plurality of outlet ports in said casing adapted for registry with said exhaust openings, operating means keyed to said shaft, and a lever loosely journaled on said shaft having its long end joined to said rotor and its short end joined to said operating means, each of said jets being formed with a forwardly extended passage whereby pressure fluid may always enter said cavities regardless of the stopped radial position of said rotor relative to said jets.

10. In a reversible turbine having a casing and a driven shaft therein, a pair of integral rotors loosely journaled on said shaft each having a series of oppositely arranged cavities disposed around its periphery with inlet and exhaust openings abutting the inner surface of said casing, there being a plurality of pressure fluid jets in said casing adapted for successive registry with said inlet openings in either of said rotors, and a plurality of outlet ports in said casing adapted for registry with said exhaust openings, operating means keyed to said shaft, and a lever loosely journaled on said shaft having its long end joined to said rotors and its short end joined to said operating means, each of said jets being formed with a forwardly extended passage in the direction of rotation whereby pressure fluid may always enter said cavities regardless of the stopped radial position of said rotors relative to said jets.

11. In a reversible turbine having a casing and a driven shaft therein, a pair of integral rotors loosely journaled on said shaft each having a series of oppositely arranged cavities disposed around its periphery with inlet and exhaust openings abutting the inner surface of said casing, there being a plurality of pressure fluid jets in said casing adapted for successive registry with said inlet openings in either of said rotors, and a plurality of outlet ports in said casing adapted for registry with said exhaust openings, operating means keyed to said shaft, a lever loosely journaled on said shaft having its long end joined to said rotors and its short end joined to said operating means, there being a pressure fluid source in said casing, there being a pair of spaced pressure fluid manifolds in said casing corresponding to the jets for both rotors, and having spaced inlet openings therein, and a hollow angularly arranged manual valve communicating at one end with said source and adapted to alternately register with said manifold openings at its other end to control the direction of rotation.

AMEL BEN BROLUSKA.

No references cited.